United States Patent [19]

Fraden et al.

[11] Patent Number: 5,163,418
[45] Date of Patent: Nov. 17, 1992

[54] SPECULUM COVER

[75] Inventors: Jacob Fraden, Hamden, Conn.; Spencer L. Mackay, Agoura Hills, Calif.; Alan Crawford, Burbank, Calif.; Mark Doyle, San Diego, Calif.; Robert P. Lackey, Carlsbad, Calif.

[73] Assignee: Thermoscan Inc., San Diego, Calif.

[21] Appl. No.: 728,843

[22] Filed: Jul. 9, 1991

Related U.S. Application Data

[63] Continuation of Ser. No. 631,173, Dec. 18, 1990, abandoned, which is a continuation of Ser. No. 409,216, Sep. 19, 1989, abandoned.

[51] Int. Cl.⁵ .......................... A61B 1/22; G01K 1/08
[52] U.S. Cl. ........................ 128/9; 374/158; 128/664
[58] Field of Search ............ 128/9, 664; 356/43; 364/557; 374/158

[56] References Cited

U.S. PATENT DOCUMENTS

| | | | |
|---|---|---|---|
| 3,282,106 | 11/1966 | Barnes | 73/355 |
| 3,812,847 | 5/1974 | Moore et al. | 128/9 |
| 3,942,891 | 3/1976 | Spielberger et al. | 356/43 |
| 3,949,740 | 4/1976 | Twentler | 128/9 |
| 4,602,642 | 7/1986 | O'Hara et al. | 128/664 |
| 4,662,360 | 5/1987 | O'Hara et al. | 128/9 |
| 4,784,149 | 11/1988 | Berman et al. | 128/664 |
| 4,790,324 | 12/1988 | O'Hara et al. | 128/664 |
| 4,797,840 | 1/1989 | Fraden | 364/557 |
| 4,863,281 | 9/1989 | Suszynski | 374/158 |
| 4,911,559 | 3/1990 | Meyst et al. | 374/158 |

Primary Examiner—Mark Graham
Attorney, Agent, or Firm—Robert A. Seemann

[57] ABSTRACT

A probe cover for an infrared thermometer has a pleated sheath which fits over the thermometer probe and a base, which is engageable with the probe, is attached to the periphery of the sheath to hold the sheath over the probe. The sheath is made of a thin infrared transparent film and is formed with a window which causes minimal attenuation of infrared emission received by the thermometer.

1 Claim, 3 Drawing Sheets

SPECULUM COVER

This is a continuation patent application of our co-pending patent application Ser. No. 631,173 filed Dec. 18, 1990 now abandoned, which is a continuation patent application of our patent application Ser. No. 409,216, filed Sep. 19, 1989 now abandoned.

FIELD OF THE INVENTION

The present invention pertains to speculum covers and their method of manufacture. More particularly, the present invention pertains to sanitary covers for probes or specula of medical instruments. The present invention is particularly, but not exclusively, useful as a probe cover for a thermometer which measures the core temperature of the human body by detecting and analyzing infrared emission from a body surface of a patient, such as in the external ear canal of a patient.

BACKGROUND OF THE INVENTION

It is well known that an accurate reading of the temperature of a human body is helpful, if not essential, for the diagnosis and treatment of numerous ailments. Indeed, several types of thermometers have been developed for these purposes. For instance, the so-called infrared thermometers are increasingly being used in addition to, or in place of, the more conventional contact thermometer. While all types of thermometers can be efficacious for their intended use, the focus here is on infrared thermometers, examples of which are disclosed in U.S. Pat. No. 4,787,840 to Fraden for an invention entitled "Infrared Electronic Thermometer and Method for Measuring Temperature" and U.S. Pat. No. 4,790,324 to O'Hara et al. for an invention entitled "Method and Apparatus for Measuring Internal Body Temperature Utilizing Infrared Emissions."

Regardless of the type of thermometer, however, for all thermometers it is necessary that there be a sanitary contact between the thermometer and the body. This means that the thermometer must either be sterilizable prior to a subsequent use, that it be used only once and then discarded, or that the thermometer be somehow protected from contact with the body. For thermometers, such as infrared thermometers, which cannot be effectively sterilized or are too expensive to be disposable, the only practical way to insure a sanitary use of the thermometer is to provide a disposable cover for that part of the thermometer which comes into contact with the body.

In order to determine the temperature of a human body, infrared thermometers typically have a probe which is inserted into the external ear canal of the patient or otherwise brought into contact with a body surface of the patient. With the probe so placed, infrared emissions from within the ear canal are received through the probe and detected by the thermometer for conversion into temperature readings. Thus, it is the probe of an infrared thermometer which contacts the body of the patient and which needs to be protected from contamination. Not surprisingly, several devices have been suggested which accomplish this purpose. For example, U.S. Pat. No. 3,949,740 to Twentier discloses a disposable plastic speculum for use on an infrared sensing thermometer and U.S. Pat. No. 4,662,360 to O'Hara et al. discloses a sanitary protective cover for the ear canal probe of a tympanic thermometer. As exemplified by the above-cited references, infrared thermometer probe covers have heretofore typically included a rigid or semi-rigid structure which is intended to perform a function in addition to partially covering the probe. In the case of U.S. Pat. No. 3,949,740 to Twentier, a rigid structure is provided for the probe cover which serves as a speculum that helps render the ear canal accessible to the probe. In the case of U.S. Pat. No. 4,662,360 to O'Hara et al., the two-part probe cover includes a relatively rigid tubular body portion which is sufficiently strong to mount and support an infrared window on the thermometer probe.

The present invention recognizes that, unlike prior art devices, the probe cover for an infrared thermometer need not function as a speculum in addition to its protective function. Further, the present invention recognizes that the functional part of a probe cover need not be either rigid or semi-rigid. Instead, as recognized by the present invention, the probe cover of an infrared thermometer can be simply a cover so long as this cover includes the infrared (IR) transparent window that must be part of any effective probe cover. Still further, the present invention recognizes that the IR transparent window of a probe cover can be an integral part of a continuously formed unitary barrier which can be positioned between the thermometer probe and the part of the body which comes into contact with the probe.

Accordingly, the present invention provides a cover for the probe speculum of an infrared thermometer which establishes an effective sanitary barrier between the probe and the part of the body that comes in contact with the probe. The present invention also provides a speculum cover which operatively positions an infrared transparent window on the probe of an infrared thermometer. Further, the present invention provides a probe cover which is easily placed on the probe of an infrared thermometer and easily removed from the probe. Still further, the present invention provides a probe cover which effectively establishes a continuous integrally formed unitary barrier between the probe and the part of the body which comes into contact with the probe. Additionally, the present invention provides a method for manufacturing a probe cover which is cost-effective and relatively easy to implement.

SUMMARY OF THE INVENTION

The preferred embodiment of a probe cover for an infrared sensitive tympanic thermometer comprises a frustum-shaped sheath having an open end and a closed end. The sheath is made from a single unitary piece of substantially infrared transparent film and the closed end of the sheath is a portion of this film which establishes an infrared window. The open end of the sheath is defined by its periphery, i.e. the edge of the piece of film.

A ring-shaped base is ultrasonically welded, bonded, or otherwise attached to the periphery of the sheath and is dimensioned to establish an interference fit with the thermometer probe when the cover is placed over the probe. Importantly, engagement of the base of the probe cover onto the probe of the thermometer positions the infrared window across the path along which infrared emissions from inside the ear canal are received by the thermometer. Preferably, the base ring is a substantially rigid plastic, and the film which forms the sheath is a thin polymer film, such as polyethylene or polypropylene, that is approximately on the order of one thousandth of an inch (0.001 in.) thick.

The manufacture of the preferred embodiment of the probe cover of the present invention is accomplished by placing a piece of infrared transparent film across the opening of an inwardly-tapered frustum-shaped cavity. This piece of film is cut (e.g. circular-shaped) and is centered over the cavity with a portion overlapping and extending beyond the opening of the cavity. A forming punch and a spring-loaded seat engage the center of the film on its opposite sides to grip the film and hold it therebetween to establish the infrared window. The forming punch, which is dimensioned for mating engagement with the frustum-shaped cavity, is then driven into the cavity to press portions of the film extending radially from the window between the forming punch and the walls of the cavity. The result is a hollow frustum-shaped sheath which has a closed end defined by the infrared window and an integral sheath wall that extends from the window toward the open end of the sheath which is defined by the periphery of the sheath. A rigid plastic base ring is then bonded or ultrasonically welded to the periphery of the sheath to complete the manufacture of the probe cover.

In an alternate embodiment of the present invention, the frustum-shaped sheath is replaced by an elongated flexible film strip which is formed with a pair of substantially parallel edges. These edges are opposite from each other and are respectively attached to oppositely disposed sides of a base member. In this combination, the film strip hangs as a sling from the base member and is stretched over the end of the probe tip of an IR thermometer when the base member is engaged to the probe of the thermometer. As so positioned, the film strip creates an IR window over the probe tip and establishes a protective covering between the probe and the part of the body which comes into contact with the probe. In the specific case where the probe is inserted into the external ear canal of a patient, insertion forces on the film strip fold the film strip onto the probe to establish a sanitary protective barrier between the probe tip and the external ear canal.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
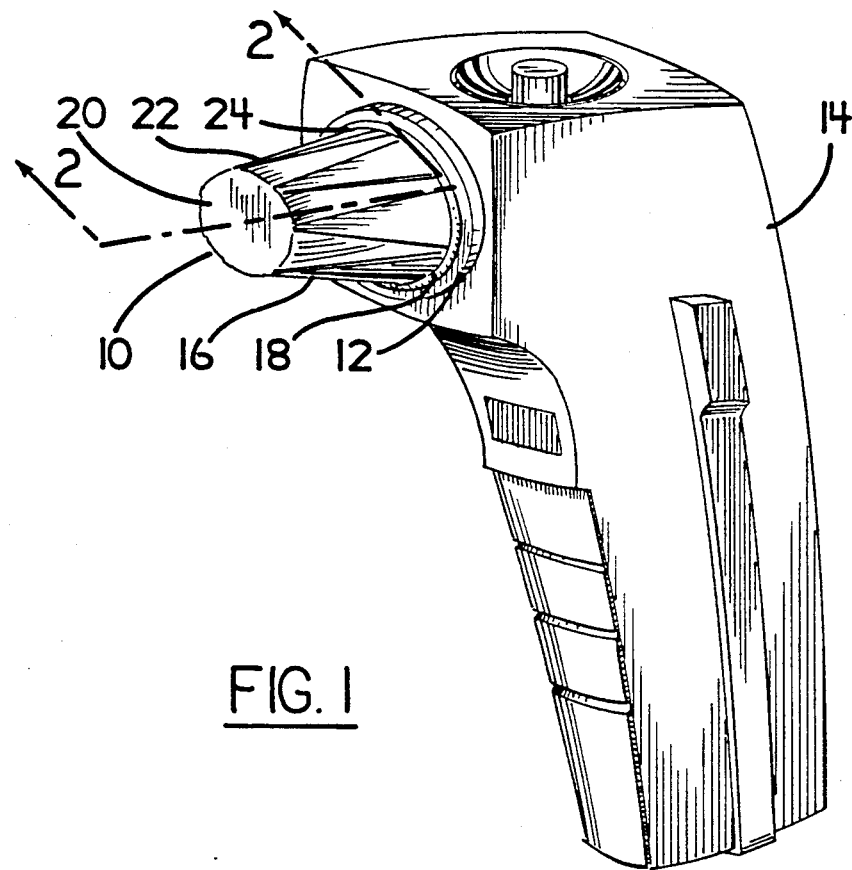
FIG. 1 is a perspective view of an infrared thermometer with the probe cover of the present invention engaged to cover the probe of the thermometer.

Referring initially to FIG. 1, a probe cover according to the present invention is generally designated 10 and is shown positioned over the probe 12 of an infrared thermometer 14. As shown, cover 10 is a two-part device which includes a hollow flexible sheath 16 that is attached to a substantially rigid base ring 18. More specifically, the hollow sheath 16 is formed from a single piece of infrared transparent material to have a flat, generally circular window 20 at the front of the cover, and a wall 22 which is tapered between the window 20 and the periphery 24 of sheath 16. When combined, the periphery 24 of sheath 16 is attached to ring 18 to create a generally hollow frustum-shaped cover 10 having a closed end defined by window 20 and an open end defined by the periphery 24 of sheath 16 at its attachment to base ring 18.

Figure 2:
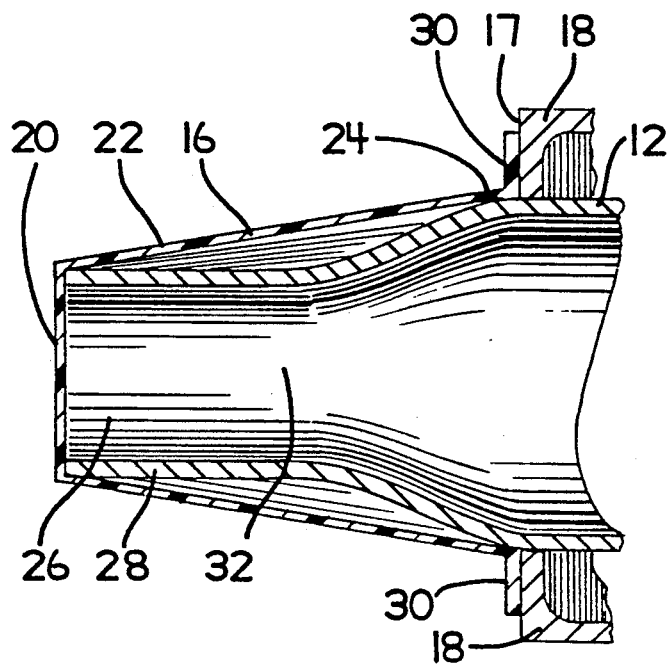
FIG. 2 is a cross-sectional view of the probe cover engaged with a portion of the thermometer probe as seen along the line 2—2 in FIG. 1.

As indicated in FIG. 1, and more clearly shown in FIG. 2, the substantially rigid base ring 18 is dimensioned for an interference fit with probe 12. With this fit, ring 18 holds cover 10 on probe 12 so that window 20 of sheath 16 is positioned directly across the opening 26 of probe tip 28. Also, as shown, wall 22 of sheath 16 extends between window 20 and ring 18 to cover a substantial portion of the probe 12. While ring 18 can be effective when made of any non-toxic plastic well known in the pertinent art, sheath 16 must be more specific. As intended for the present invention and indicated above, the entire sheath 16, to include both window 20 and tapered wall 22, is made from a single continuous piece of film. Preferably, this film is a polymer such as polyethylene or polypropylene and is approximately one thousandth of an inch (0.001 in.) thick. Regardless of the particular material used for the manufacture of the film, however, it is important that the film, and consequently sheath 16, be substantially transparent to transmission of infrared energy. Specifically, it is important that window 20 be infrared transparent. Further, in order to obtain consistent results and minimize any attenuation of the infrared emission which will pass through the window 20, window 20 should preferably be as flat and winkle-free as possible.

Still referring to FIG. 2, it will be seen that the periphery 24 of sheath 16 is formed as a flange 30 which is attached to the front facing surface 17 of base ring 18. As will be appreciated by the skilled artisan, flange 30 at the periphery 24 of sheath 16 can be attached to ring 18 in a number of ways, such as by solvent bonding or ultrasonic welding.

With cover 10 positioned on probe 12 of thermometer 14 as shown in both FIG. 1 and FIG. 2, it will be appreciated that sheath 16 serves as a sanitary barrier. Specifically, sheath 16 acts as a barrier which protects a patient from direct contact with probe 12 and probe tip 28 when these parts of thermometer 14 come into physical contact with the patient (not shown). Although sheath 16 is an effective sanitary barrier, because window 20 is infrared transparent, infrared emissions from inside the patient's ear canal can still pass along a path through window 20 of sheath 16 and on through channel 32 of probe 12 for detection and display by thermometer 14.

Figure 3A:
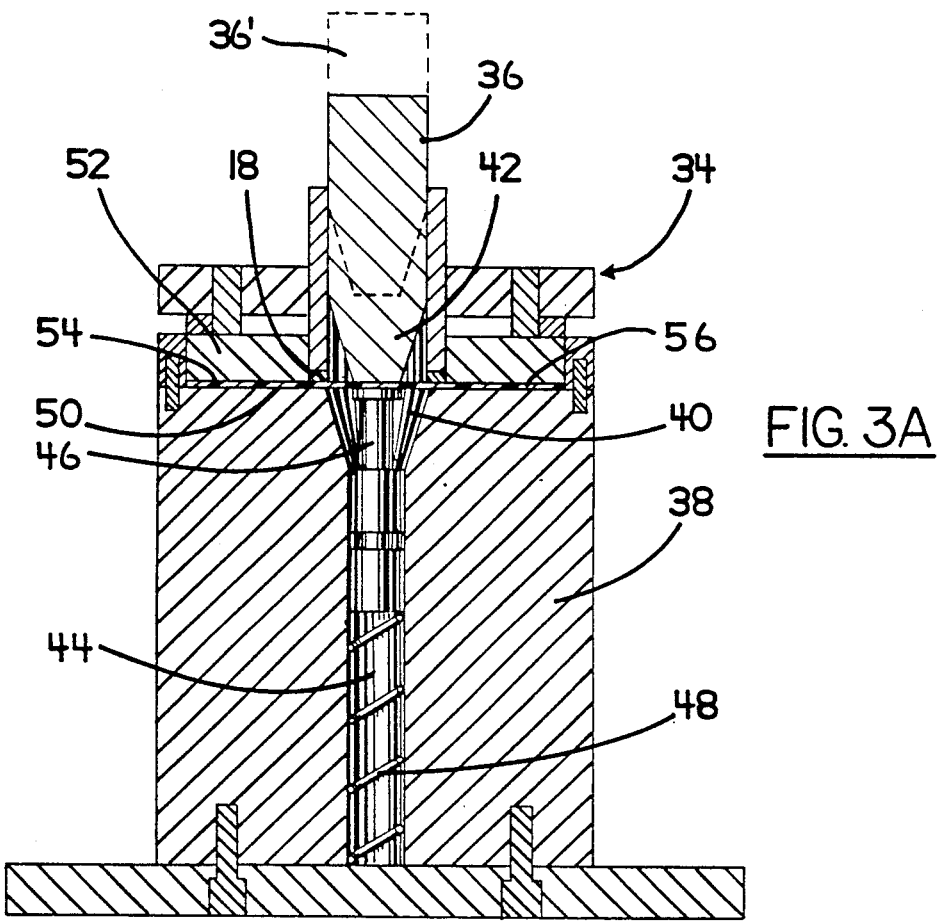
FIG. 3A is an elevational view of a probe cover forming tool with its forming punch in a withdrawn position and with portions of the tool shown in cross section for clarity.
Figure 3B:
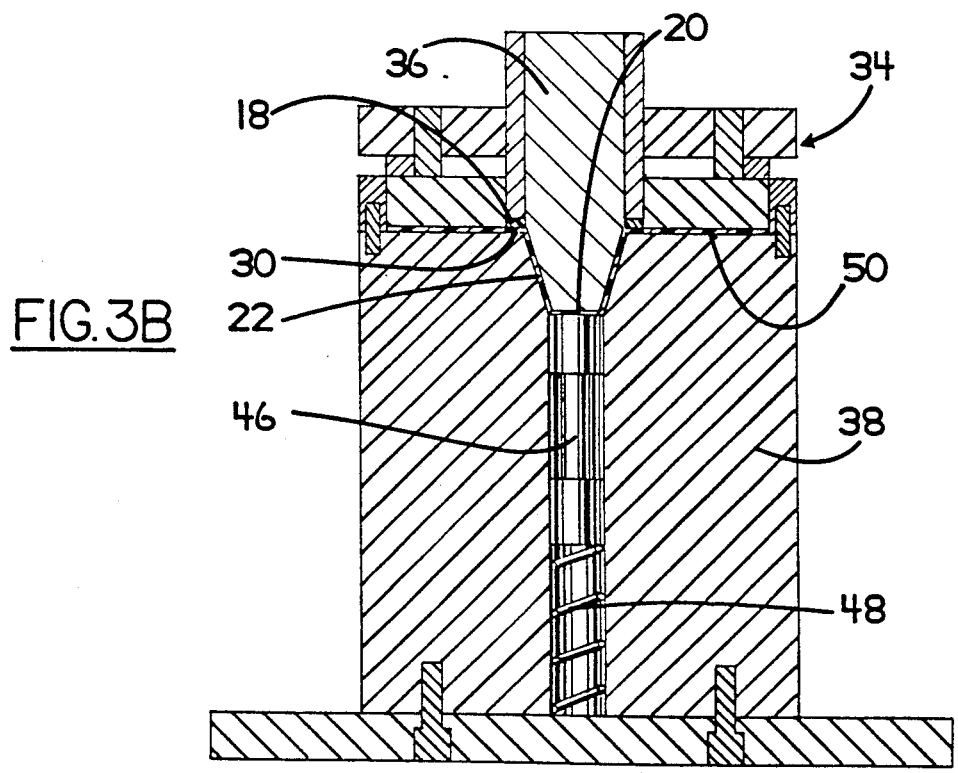
FIG. 3B is an elevational view of the probe cover forming tool as shown in FIG. 3A with the forming punch in an inserted position.

The manufacture of cover 10 will be best appreciated by reference to FIGS. 3A and 3B. Referring first to FIG. 3A, it can be seen that a forming fixture, generally designated 34, has a forming punch 36 and a forming member 38. As shown, member 38 is formed with a frusto-conical-shaped cavity 40 which is dimensioned to matingly receive the frusto-conical-shaped nose 42 of forming punch 36. Member 38 is also formed with a guide channel 44 in which a seat 46 is reciprocally diposed. A biasing means such as spring 48 is also positioned in the guide channel 44 to urge seat 46 into the position substantially as shown in FIG. 3A. When seat 46 is in this position shown in FIG. 3A, forming punch 36 is either in its withdrawn position, as shown, or in a disengaged position as indicated by forming punch 36' (shown in phantom in FIG. 3A). Member 38 also establishes a surface 50 which surrounds the cavity 40 and which is specifically textured for purposes to be subsequently disclosed.

A holding ring 52 is positioned above the surface 50 to create a gap 54 between surface 50 and ring 52 in which a thin infrared transparent polyethylene film 56 can be held. With the film located in this gap 54, forming punch 36 and seat 46 are able to grip a portion of film 56 from its opposite sides.

In the operation of forming fixture 34, a film 56 is positioned in the gap 54 between holding ring 52 and the surface 50 of forming member 38 while forming punch 36' is in its disengaged position. Within the gap 54, film 56 extends across and beyond the opening of frusto-conical-shaped cavity 40. As so positioned, film 56 is gripped between seat 46 and the forming punch 36 substantially as shown in FIG. 3A. A portion of film 56 is then die cut, by blades on holding ring 52 (not shown), into a circle which is centered on cavity 40.

Figure 4:
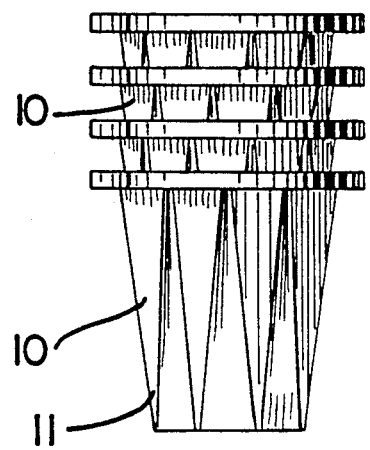
FIG. 4 is an elevational view of a plurality of nested probe covers.

Movement of forming punch 36 from its withdrawn position (shown in FIG. 3A) to its inserted position (shown in FIG. 3B) draws the circular die cut portion of film 56 into cavity 40 to form sheath 16. Specifically, as forming punch 36 is inserted into cavity 40, window 20 is formed and held flat by the gripping action of spring-loaded seat 46 against nose 42 of punch 36. Further, as forming punch 36 is inserted into the cavity 40, textured surface 50 provides a resistive force on film 56 which helps to uniformly guide the film 56 into the cavity between the wall of cavity 40 and nose 42 of forming punch 36. As will be appreciated by the skilled artisan, surface 50 may be serrated or otherwise configured to accomplish the same result achieved by a textured surface. Also it happens that as film 56 is drawn into cavity 40, the portion of film 56 which is wedged between nose 42 and the sides of cavity 40 is pleated axially in a plurality of axially oriented pleats 11, each pleat extending approximately from the front of the cover to the base and increasing in width toward the base as seen in FIG. 4 to form the wall 22 of sheath 16. When forming punch 36 is completely advanced to its inserted position, a small portion of the die cut piece of film 56 remains extending out of the cavity 40 to form flange 30 at the periphery 24 of sheath 16. Ring 18 is then attached to this flange 30. Though not shown in FIG. 3B, it will be appreciated by the skilled artisan that the bushing 58 which surrounds forming punch 36 and which makes direct contact with ring 18 when punch 36 is in its inserted position, may be vibrated by a generator (not shown) to cause ultrasonic welding of the ring 18 to the flange 30 of sheath 16. As indicated above, other well known procedures can be used to attach ring 18 to flange 30.

FIG. 4 shows a possible method for the storage of probe covers 10 which may be effectively employed. Specifically, due to the dimensions and flexibility of sheaths 16, the probe covers 10 can be nested, as shown, for space saving considerations.

Figures 5, 6:
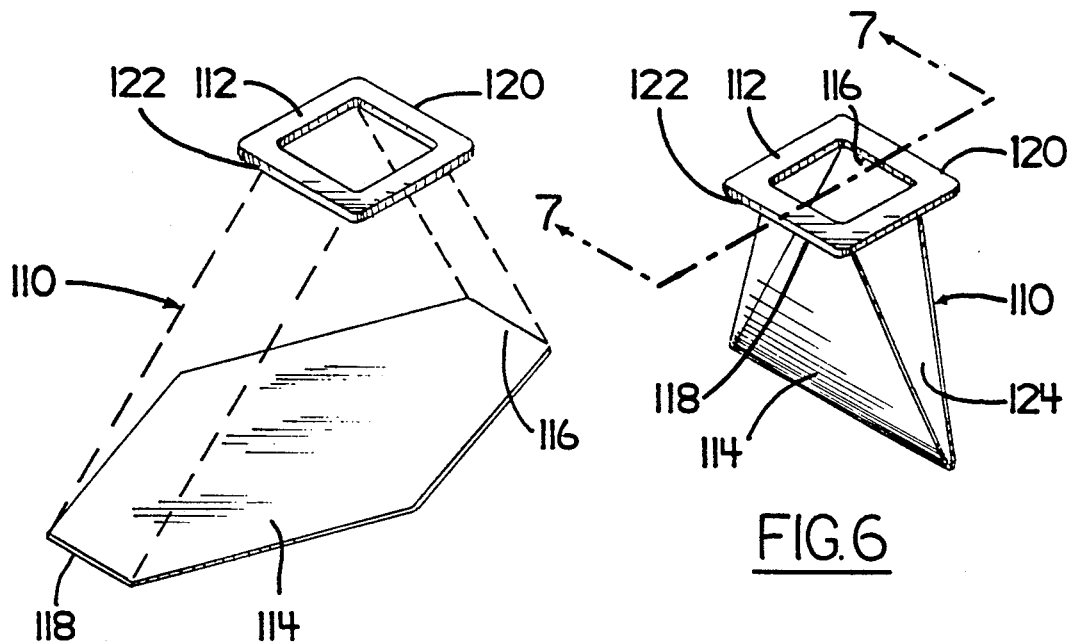
FIG. 5 is an exploded view of an alternate embodiment of a probe cover.
FIG. 6 is a perspective view of the alternate embodiment shown in FIG. 5 when assembled.

FIG. 5 shows an exploded view of an alternate embodiment of the probe cover for the present invention generally designated 110. As shown, cover 110 comprises a substantially rectangular (e.g. square) base member 112 and an elongated flexible film strip 114. Similar to film 56 for the preferred embodiment, film strip 114 is a flexible polymer film which is substantially transparent to infrared emission and is on the order of approximately one thousandth of an inch thick (0.001 in.). Like base ring 18 for the preferred embodiment, base member 112 is preferably made of a rigid plastic.

Film strip 114 can be of any desired shape, and is shown in FIG. 5 to be generally hexagonal only for purposes of discussion. As so shown, film strip 114 is formed with a pair of substantially parallel edges 116 and 118 and, as indicated in FIG. 5 and shown in FIG. 6, these edges 116 and 118 are respectively attached to the oppositely disposed sides 120 and 122 of base member 112.

As best seen in FIG. 6, when film strip 114 is attached to base member 112, the strip 114 is folded and hangs as a sling 124. By cross referencing FIGS. 6 and 7, it will be seen that sling 124 defines an opening 126 which extends between sling 124 and base member 112 in a direction generally parallel to the sides 120 and 122.

Figures 7, 8:
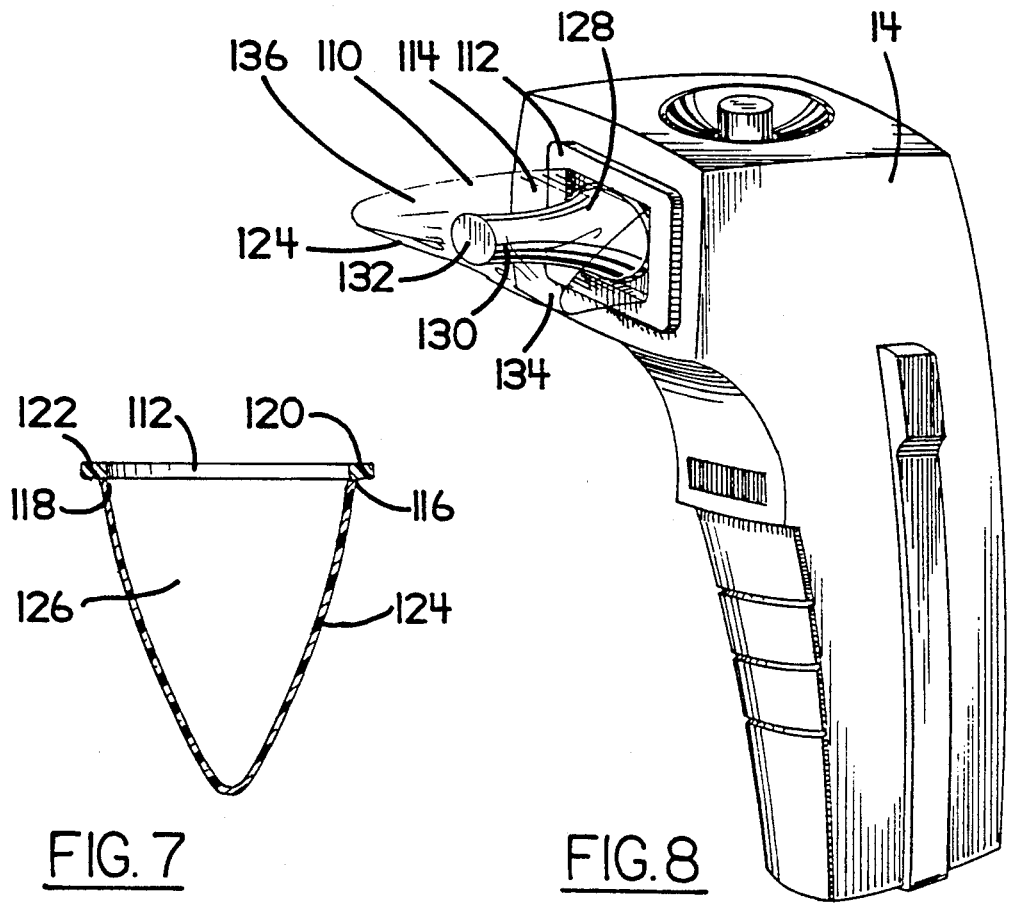
FIG. 7 is a cross-sectional view of the alternate embodiment as seen along the line 7—7 in FIG. 6.
FIG. 8 is a perspective view of the alternate embodiment of the probe cover engaged with the probe of an IR thermometer.

FIG. 8 shows that cover 110 is engageable with the probe 128 of thermometer 14. Specifically, probe 128 is formed with a generally rectangular portion that is engageable with base member 112. When base member 112 is so engaged, film strip 114 is stretched over the probe tip 130 of probe 128 to create an IR transparent window 132. This positioning also creates the flaps 134 and 136 of film strip 114 which extend laterally from window 132. It will be appreciated by the skilled artisan that when cover 110 is positioned on probe 128, the film strip 114 establishes a protective covering between probe 128 and the part of the body which comes into contact with probe 128. Further, when probe 128 is inserted into the external ear canal of a patient (not shown), the flaps 134 and 136 fold onto probe 128 to establish a sanitary barrier between probe 128 and the patient's ear canal.

While the particular specula covers as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as defined in the appended claims.

We claim:

1. A cover positionable over a probe and probe tip of an infrared thermometer, said cover having a front and a back and being of two parts, the parts being a base having a front, and a sheath;

said base being dimensioned and adapted for engaging said probe for holding said cover on said probe; and said sheath being a single, unitary, flexible, hollow structure of an infrared transparent film, said structure including a window, a circumferential peripheral flange, and an integrally continuous wall connecting said window with said flange, said flange being attached to said base and adapted to hold said window over said probe tip when said base is fitted on said probe, and said wall adapted to cover at least a portion of said probe when said base is fitted on said probe, said film being thin and made of a polymer material, said wall including a plurality of axially oriented pleats, each pleat extending approximately from the front of the cover to the base and increasing in width toward the base.

* * * * *